(12) United States Patent
Ishi

(10) Patent No.: US 10,058,935 B2
(45) Date of Patent: Aug. 28, 2018

(54) CUTTING INSERT, CUTTING TOOL, AND METHOD OF MANUFACTURING MACHINED PRODUCT

(71) Applicant: KYOCERA Corporation, Kyoto-shi, Kyoto (JP)

(72) Inventor: Hirohisa Ishi, Omihachiman (JP)

(73) Assignee: KYOCERA CORPORATION, Kyoto-Shi, Kyoto (JP)

( * ) Notice: Subject to any disclaimer, the term of this patent is extended or adjusted under 35 U.S.C. 154(b) by 61 days.

(21) Appl. No.: 15/037,153

(22) PCT Filed: Nov. 18, 2014

(86) PCT No.: PCT/JP2014/080425
§ 371 (c)(1),
(2) Date: May 17, 2016

(87) PCT Pub. No.: WO2015/076232
PCT Pub. Date: May 28, 2015

(65) Prior Publication Data
US 2016/0288223 A1 Oct. 6, 2016

(30) Foreign Application Priority Data
Nov. 20, 2013 (JP) ................. 2013-240242

(51) Int. Cl.
*B23C 5/20* (2006.01)
(52) U.S. Cl.
CPC ...... *B23C 5/207* (2013.01); *B23C 2200/0455* (2013.01); *B23C 2200/0461* (2013.01);
(Continued)

(58) Field of Classification Search
CPC ..... B23C 5/202; B23C 5/207; B23C 2200/08; B23C 2200/03; B23C 2200/123;
(Continued)

(56) References Cited

U.S. PATENT DOCUMENTS 4,288,179 A * 9/1981 Kruger ................. B23B 27/143
407/114
5,695,303 A * 12/1997 Boianjiu ............... B23B 27/141
407/114
(Continued)

FOREIGN PATENT DOCUMENTS

EP 0790094 A1 8/1997
EP 2198997 A2 6/2010
(Continued)

OTHER PUBLICATIONS

International Search Report, PCT/JP2014/080425, dated Feb. 17, 2015, 2 pgs.
(Continued)

*Primary Examiner* — Daniel Howell
*Assistant Examiner* — Yasir Diab
(74) *Attorney, Agent, or Firm* — Volpe and Koenig, P.C.

(57) ABSTRACT

A cutting insert according to an embodiment has a lower surface, an upper surface, a side surface disposed between the lower surface and the upper surface, a pair of corner cutting edges located along an intersection of the upper surface and the side surface, and a major cutting edge located between the pair of corner cutting edges. The major cutting edge has a downwardly dented curvilinear part and a pair of straight parts respectively extending from the curvilinear part toward the pair of corner cutting edges in a side view. A portion of the curvilinear part located lowermost is close to one corner cutting edge in the side view.

19 Claims, 10 Drawing Sheets

(52) U.S. Cl.
CPC .... *B23C 2200/08* (2013.01); *B23C 2200/123* (2013.01); *B23C 2200/203* (2013.01); *B23C 2200/205* (2013.01); *B23C 2200/208* (2013.01)

(58) Field of Classification Search
CPC .......... B23C 2200/20; B23C 2200/203; B23C 2200/208; Y10T 409/303808
See application file for complete search history.

(56) References Cited

U.S. PATENT DOCUMENTS

| | | | |
|---|---|---|---|
| 5,951,212 | A | 9/1999 | Emoto et al. |
| 6,050,752 | A | 4/2000 | Deroche |
| 6,530,726 | B2 * | 3/2003 | Nelson ................... B23C 5/202 407/114 |
| 2008/0232912 | A1 | 9/2008 | Bhagath |
| 2009/0097929 | A1 * | 4/2009 | Festeau ................... B23C 5/202 407/114 |
| 2010/0303563 | A1 * | 12/2010 | Fang ...................... B23C 5/109 407/113 |
| 2012/0045289 | A1 | 2/2012 | Ishi |
| 2012/0070242 | A1 * | 3/2012 | Choi ...................... B23C 5/109 407/113 |
| 2014/0126970 | A1 | 5/2014 | Maeta et al. |
| 2014/0126974 | A1 | 5/2014 | Koga |

FOREIGN PATENT DOCUMENTS

| | | |
|---|---|---|
| EP | 2436465 A1 | 4/2012 |
| EP | 2567768 A1 | 3/2013 |
| EP | 2727672 A1 | 5/2014 |
| EP | 2783779 A1 | 10/2014 |
| JP | 09-216113 A | 8/1997 |
| JP | 11-347826 A | 12/1999 |
| JP | 2002-539958 A | 11/2002 |
| WO | 00/56493 A1 | 9/2000 |
| WO | 2010/137663 A1 | 12/2010 |
| WO | 2013/001907 A1 | 1/2013 |
| WO | 2013/077443 A1 | 5/2013 |

OTHER PUBLICATIONS

Extended European Search Report, European Patent Application No. 14864716.7, dated Jun. 22, 2017, 12 pgs.

* cited by examiner

CUTTING INSERT, CUTTING TOOL, AND METHOD OF MANUFACTURING MACHINED PRODUCT

TECHNICAL FIELD

The present embodiment relates to a cutting insert, a cutting tool, and a method of manufacturing a machined product.

BACKGROUND ART

As a cutting insert for use in a cutting process of a workpiece, for example, cutting inserts disclosed in Japanese Unexamined Patent Publication No. 9-216113 (Patent Document 1) and Japanese Unexamined Patent Publication No. 11-347826 (Patent Document 2) have conventionally been known. The cutting inserts respectively described in Patent Documents 1 and 2 are specifically used in a milling process, such as a face milling process or an end milling process. In the cutting inserts respectively described in Patent Documents 1 and 2, a cutting edge is curved so as to be dented downward in a side view.

In the cutting inserts respectively described in Patent Documents 1 and 2, setting is made so that a cutting edge angle of a major cutting edge with respect to a workpiece is 45° or 90°. Therefore, when cutting the workpiece, a chip thickness increases, thus leading to large impact exerted on the major cutting edge. Furthermore, there occurs a large amount of heat generated when the major cutting edge cuts the workpiece, and there is a large risk that a fracture occurs in the major cutting edge.

SUMMARY OF THE INVENTION

A cutting insert according to an aspect of the embodiment has a polygonal shaped upper surface has a pair of corner parts and a side part located between the pair of corner parts, a polygonal shaped lower surface corresponding to the upper surface, a side surface disposed between the lower surface and the upper surface, a pair of corner cutting edges located along an intersection of the pair of corner parts of the upper surface and the side surface, and a major cutting edge located between the pair of corner cutting edges. The major cutting edge has a downwardly dented concave shape as a whole, and has a first section having a downwardly dented concave curvilinear shape in a side view, and a pair of second sections being in the shape of a straight-like line. The pair of second sections respectively extend from the first section toward the pair of corner cutting edges, and have a larger height as approaching the pair of corner cutting edges. A portion of the first section which is located lowermost is close to one of the corner cutting edges in the side view.

EMBODIMENTS FOR CARRYING OUT THE INVENTION

<Cutting Insert>

A cutting insert 1 (hereinafter also referred to simply as the insert 1) according to an embodiment is described below with reference to FIGS. 1 to 3. A chain double-dashed line in FIG. 1 indicates a central axis X of the cutting insert 1.

Figure 1:
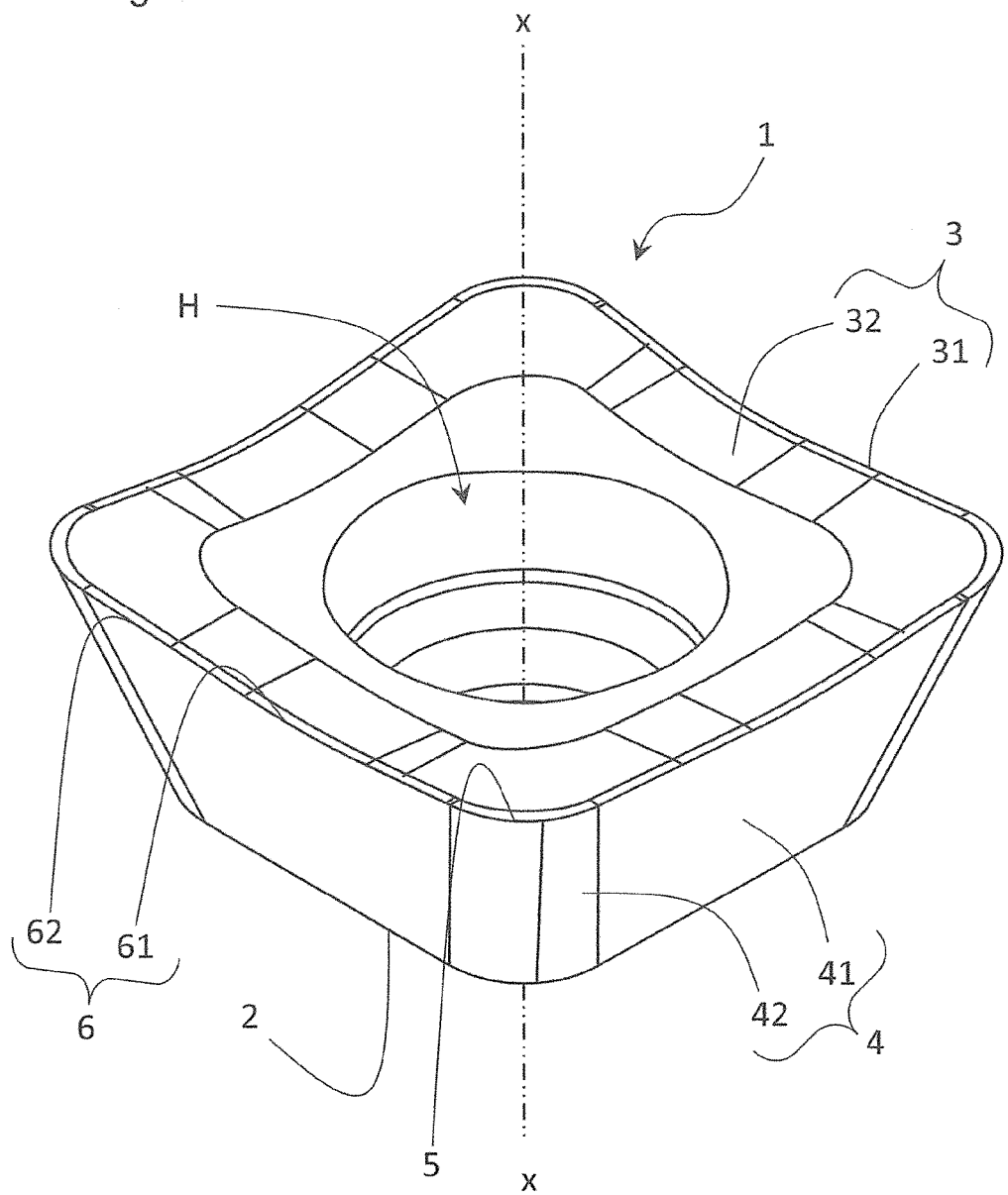
FIG. 1 is a perspective view showing a cutting insert of an embodiment.
Figure 2:
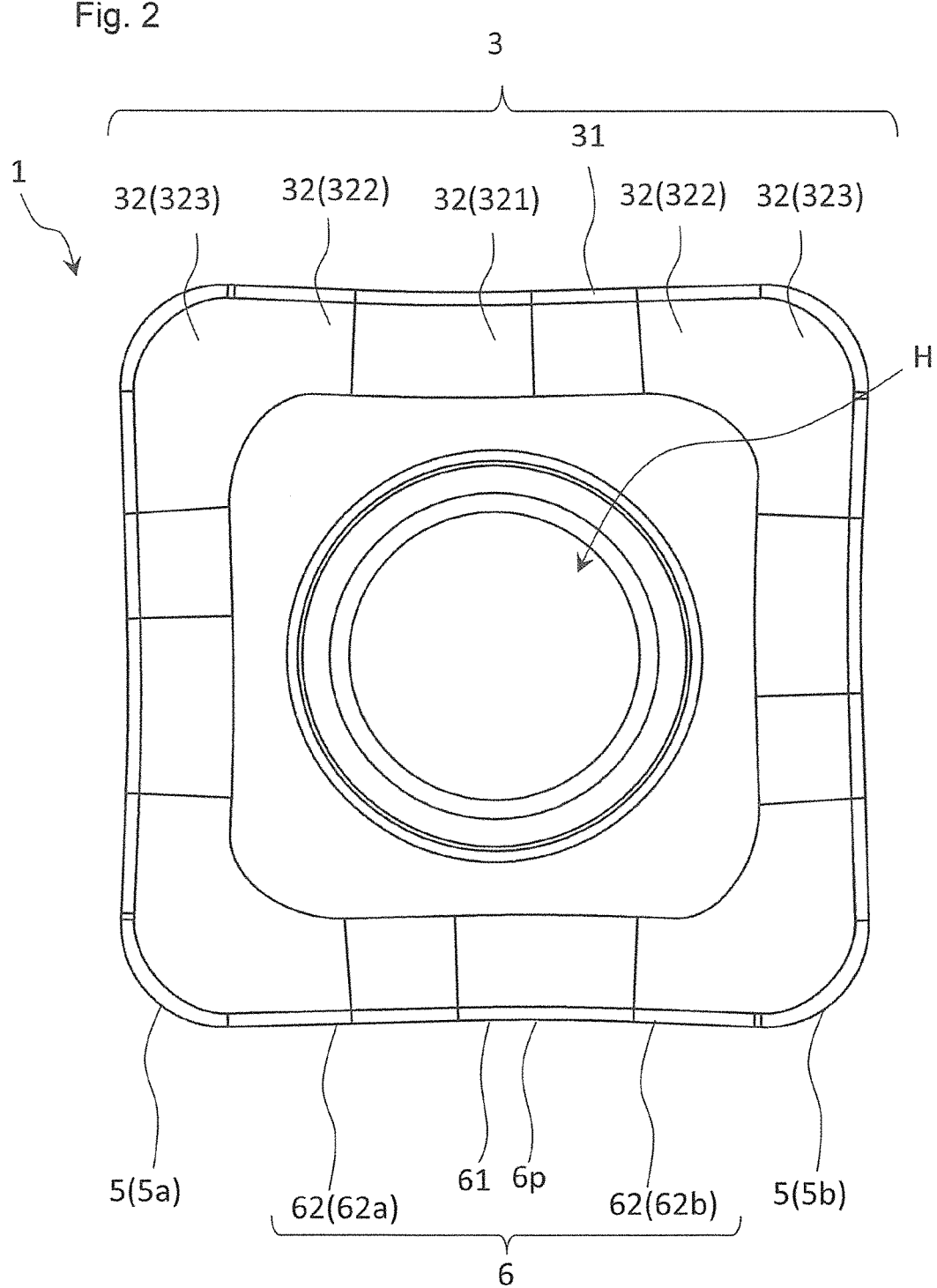
FIG. 2 is a top view of the cutting insert shown in FIG. 1.
Figure 3:
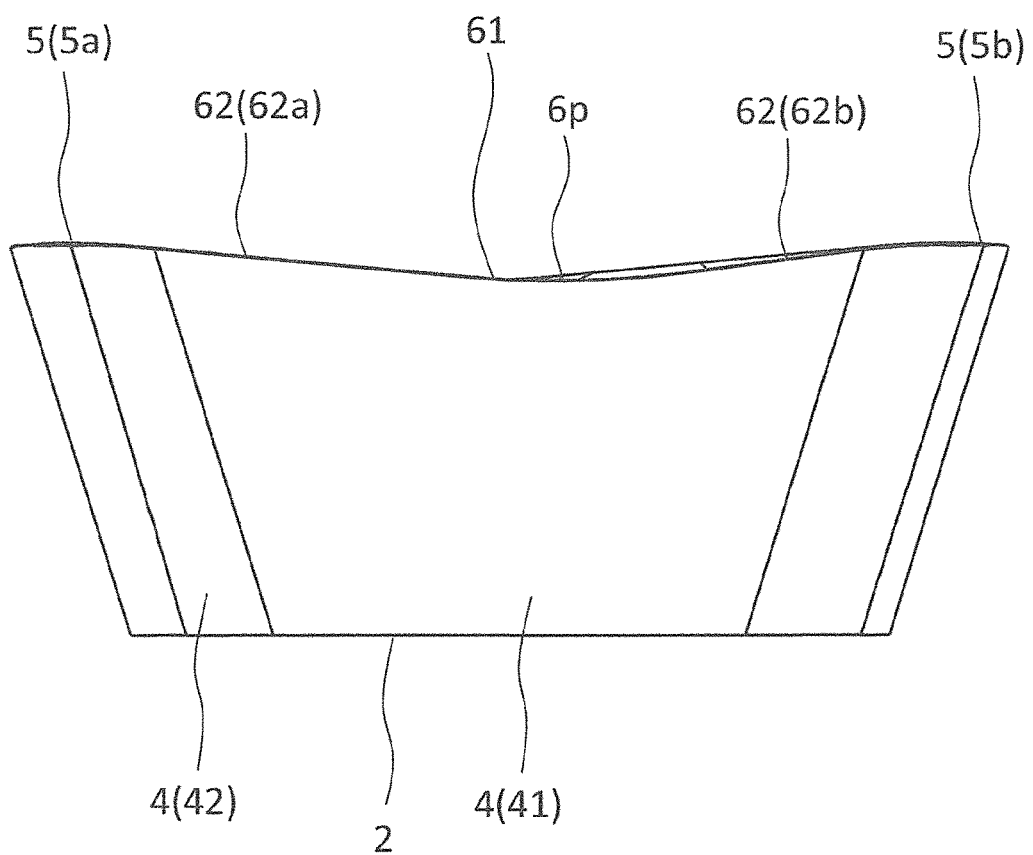
FIG. 3 is a side view of the cutting insert shown in FIG. 1.

As shown in FIGS. 1 to 3, the insert 1 of the present embodiment has a lower surface 2, an upper surface 3, a side surface 4 disposed between the lower surface 2 and the upper surface 3, a pair of corner cutting edges 5 (5a, 5b) located along an intersection of the upper surface 3 and the side surface 4, and a major cutting edge 6 located between the pair of corner cutting edges 5 (5a, 5b). The upper surface 3 has a polygonal shape, and has a pair of corner parts and a side part located between the pair of corner parts. The lower surface 2 has a polygonal shape corresponding to the upper surface 3. The pair of corner cutting edges 5 is located along an intersection of the pair of corner parts of the upper surface 3 and the side surface 4. The major cutting edge 6 is located along an intersection of the side part of the upper surface 3 and the side surface 4.

The major cutting edge 6 has a concave shape that is dented downward as a whole, and has a first section (curvilinear section) and a pair of second sections (straight parts). The first section has a concave curvilinear shape dented downward in a side view. The pair of second sections, each being in the shape of a straight-like line, respectively extend from the first section toward the pair of corner cutting edges 5 (5a, 5b), and have a larger height as approaching the pair of corner cutting edges (5a, 5b). A portion (bottom portion) 6p of the first section which is located lowermost is closer to the corner cutting edge 5b.

One of the corner cutting edges 5a and 5b which is close to a processing surface of a workpiece when cutting the workpiece is taken as a first corner cutting edge 5a, and the other located away from the processing surface of the workpiece when cutting the workpiece is taken as a second corner cutting edge 5b.

The upper surface 3 has the polygonal shape, and has a pair of corner parts and a side part located between the pair of corner parts. The lower surface 2 has the polygonal shape corresponding to the upper surface 3. The lower surface 2 and the upper surface 3 of the insert 1 in the present embodiment respectively have a square shape having a plurality of corner parts. The corner parts in the present embodiment are not corners in the strict sense of the word, but have a curved arc shape in the top view.

Therefore, in the insert 1 of the present embodiment, arc shaped portions respectively located at the corner parts of the upper surface 3 serve as the corner cutting edges 5, and a portion of a circumferential edge of the upper surface 3 which is located between the arc shaped corner parts is the side part and serves as the major cutting edge 6.

A through hole H that penetrates vertically is formed in the insert 1. The through hole H extends between a middle portion of the upper surface 3 and a middle portion of the lower surface 2. The through hole H is a hole that permits passage of a screw, and is used for fixing the insert 1 to a holder by screwing the screw into the holder. An opening of the through hole H has a circular shape in the top view, and has a diameter of, for example, 2-12 mm. The through hole H extends between a center of the upper surface 3 and a center of the lower surface 2. Accordingly, a central axis X of the through hole H extends vertically.

For example, cemented carbide or cermet is usable as a material of the insert 1. Examples of compositions of cemented carbide include WC—Co produced by adding cobalt (Co) powder to tungsten carbide (WC), followed by sintering, WC—TiC—Co produced by adding titanium carbide (TiC) to WC—Co, and WC—TiC—TaC—Co produced by adding tantalum carbide (TaC) to WC—TiC—Co. The cermet is a sintered composite material obtained by compositing metal with a ceramic ingredient, and is specifically a titanium compound composed mainly of titanium carbide (TiC) or titanium nitride (TiN).

A surface of the insert 1 may be coated with a film by chemical vapor deposition (CVD) method or physical vapor deposition (PVD) method. Examples of compositions of the film include titanium carbide (TiC), titanium nitride (TiN), titanium carbonitride (TiCN), and alumina ($Al_2O_3$).

The lower surface 2 or the upper surface 3 in the insert 1 has a maximum width of 5-20 mm. A height from the lower surface 2 to the upper surface 3 is 2-8 mm. The shapes of the upper surface 3 and the lower surface 2 are not limited to the foregoing ones. For example, the shape of the upper surface 3 in the top view may be a polygonal shape, such as a triangular shape, a pentagonal shape, a hexagonal shape, and an octagonal shape.

As shown in FIGS. 1 and 2, the upper surface 3 has a land surface 31 and a rake surface 32. The land surface 31 is continuous with the corner cutting edges 5 and the major cutting edge 6. The corner cutting edges 5 and the major cutting edge 6 correspond to an outer edge of the upper surface 3. The rake surface 32 is disposed in a region closer to the through hole H than the land surface 31. The rake surface 32 is an inclined surface whose height decreases as approaching the through hole H. The lower surface 2 in the present embodiment is disposed on a plane orthogonal to the central axis X.

The land surface 31 is continuous with the corner cutting edges 5 and the major cutting edge 6, and is disposed in a region closer to the central axis X than the corner cutting edges 5 and the major cutting edge 6. The land surface 31 is a narrow band shaped surface disposed along the corner cutting edges 5 and the major cutting edge 6. An interior angle formed with the side surface 4 is larger than with the rake surface 32. Specifically, the land surface 31 is an inclined surface that is approximately parallel to the lower surface 2, or an inclined surface whose height increases as approaching the center. A part of a region of the land surface 31 which is close to the corner cutting edges 5 may have a smaller height as approaching the center.

The corner cutting edges 5 and the major cutting edge 6 are disposed along an intersection of the land surface 31 and the side surface 4. The land surface 31 is disposed for enhancing strength of the corner cutting edges 5 and the major cutting edge 6. The rake surface 32 located inside the land surface 31 is an inclined surface whose height decreases as approaching the center. Therefore, the rake surface 32 and the side surface 4 form a small interior angle.

However, the interior angle formed by the land surface 31 and the side surface 4 is larger than an interior angle formed by the rake surface 32 and the side surface 4. Therefore, the strength of the corner cutting edges 5 and the major cutting edge 6 can be enhanced by having the land surface 31. A width of the land surface 31 located between the outer edge of the upper surface 3 and an outer edge of the rake surface 32 is suitably set according to cutting conditions, and is set, for example, in a range of 0.05-0.5 mm.

The rake surface 32 is continuous with the land surface 31 and disposed at a region closer to the central axis X than the land surface 31. The rake surface 32 is a surface along which chips cut by the major cutting edge 6 graze. Therefore, the chips of the workpiece 200 flow along a surface of the rake surface 32. The rake surface 32 is an inclined surface whose height decreases as approaching the center of the upper surface 3 in order to achieve a satisfactory disposal of the chips.

Although not particularly illustrated, an inclination angle indicated by an angle formed by the lower surface 2 in a cross section perpendicular to the rake surface 32 and the rake surface 32 needs to be set, for example, in a range of 5-30°. The rake surface 32 needs to have a height that decreases as approaching the center in order that the rake surface 32 is capable of scooping out the chips. Therefore, the rake surface 32 may be made up of a plurality of regions that are different in inclination angle.

To be specific, the rake surface 32 in the insert 1 of the present embodiment has a first rake surface 321 located along a curvilinear part 61 (first section 61) of the major cutting edge 6, a second rake surface 322 located along a straight part 62 (second section 62) of the major cutting edge 6, and a third rake surface 323 located along the corner cutting edge 5. In the present embodiment, a rake angle of the second rake surface 322 is larger than a rake angle of each of the first rake surface 321 and the third rake surface 323. In other words, as compared with the rake angle of the second rake surface 322, each of the first rake surface 321 and the third rake surface 323 is smaller than the rake angle of the second rake surface 322.

A chip flow direction changes in each of regions of the rake surface extending along the corner cutting edges 5 and the curvilinear part 62, which are curved regions in the cutting edge. These regions of the rake surface are therefore apt to receive a relatively large load. It is however possible to enhance strength of these regions because the first rake surface 321 and the third rake surface 323 have a relatively large rake angle. This contributes to improving durability of the insert 1.

In the present embodiment, the rake angle of the first rake surface 321 is also larger than the rake angle of the third rake surface 323. Owing to the fact that the corner cutting edges 5 have a larger curvature than the curvilinear part 61, a change in flow direction of chips flowing along the third rake surface 323 is larger than a change in flow direction of chips flowing along the first rake surface 321. On this occasion, strength of the third rake surface 323 can be enhanced owing to the relatively small rake angle of the third rake surface 323, thereby improving the durability of the insert 1.

Each of the first rake angle 321, the second rake angle 322, and the third rake angle 333 needs to be evaluated by a rake angle in a cross section that passes through a center of a region of their respective corresponding cutting edges and is orthogonal to the cutting edge. For example, a rake angle in a cross section that passes through a center of the curvilinear part 61 and is orthogonal to the curvilinear part 61 at the center serves as the first rake surface 321.

The side surface 4 is disposed between the lower surface 2 and the upper surface 3. The side surface 4 functions as a flank surface, and is connected to the outer edge of the upper surface 3. The side surface 4 has a plane part 41 located at a portion corresponding to the major cutting edge 6, and a curved surface 42 located at a portion corresponding to the corner cutting edges 5. Thus, the side surface 4 has the plane part 41 being continuous with the major cutting edge 6. A length of the plane part 41 along a direction parallel to the lower surface 2 in a side view is set, for example, in a range of 5-20 mm. A vertical length of the plane part 41 in the side view is set in a range of 2-8 mm. The curved surface 42 is located at a portion where the plane parts 41 respectively located on different side surfaces are connected to each other.

Owing to the fact that the plane part 41 is disposed on the side surface 4, measurement of a wear condition of the flank surface only needs to observe a degree of wear of a surface of the plane part 41. It is therefore easy to measure the wear by an actual measurement from a photograph or the like. In the present embodiment, an entirety extending from an upper end to a lower end in the portion of the side surface 4 corresponding to the major cutting edge 6 is taken as the plane part 41, but not limited to this. For example, a partial region being continuous with the major cutting edge 6 may be taken as the plane part 41, and a step or the like may be disposed below the plane part 41. The major cutting edge 6 is disposed along the side part that is the intersection of the upper surface 3 and the side surface 4. As shown in FIG. 3, the major cutting edge 6 has an upwardly concaved shape as a whole in the side view.

Owing to the fact that the plane part 41 is disposed on the side surface 4, a plurality of kinds of inserts 1 are attachable to the holder without changing the shape of the holder, as long as the side surface 4 has the same shape as the plane part 41. It is consequently possible to machine the workpiece 200 into a desired shape only by selecting and attaching a necessary insert 1 to the holder 101 according to the material of the workpiece 200 and the size of the workpiece 200. That is, it is unnecessary to replace the holder 101 with one corresponding to the insert 1. This simplifies a method of manufacturing a machined product, thereby improving producibility of the machined product.

The major cutting edge 6 is disposed along the intersection of the upper surface 3 and the side surface 4. As shown in FIG. 3, the major cutting edge 6 has the first section 61 (curvilinear part 61) having the downwardly dented concave curvilinear shape, and the pair of second sections 62 (straight parts 62) disposed continuously with the curvilinear part 61 in a side view.

The curvilinear part 61 is disposed at a portion whose height position is relatively low in the major cutting edge 6 as shown in FIG. 3. The corner cutting edges 5 are respectively disposed at portions whose height position is relatively high. Setting is made so that the curvilinear part 61 is located below the corner cutting edges 5 so as to be located lower in a range of 0.2-2 mm in a vertical direction. The curvilinear part 61 is curved in the side view, and has the bottom portion 6p located lowermost in the major cutting edge 6 in the vertical direction.

With the configuration that the curvilinear part 61 and the pair of straight parts 62 interposing therebetween the curvilinear part 61 are disposed on the major cutting edge 6, it is possible to eliminate the possibility that the major cutting edge 6 comes into contact with the workpiece 200 over a full length of the major cutting edge 6 at the same time when cutting the workpiece 200, and it is also possible to reduce a portion of the full length of the major cutting edge 6 which comes into contact with the workpiece 200 at the same time. Specifically, one of the pair of first corner cutting edges 5a comes into contact with the workpiece 200, and thereafter the straight part 62 and the curvilinear part 61 come into contact with the workpiece 200. It is consequently possible to prevent occurrence of chatter vibration in the cutting tool 100 by preventing a rapid increase in cut resistance of the major cutting edge 6 of the insert 1 so as to relax impact transmitted from the workpiece 200 to the insert 1.

Figure 6:
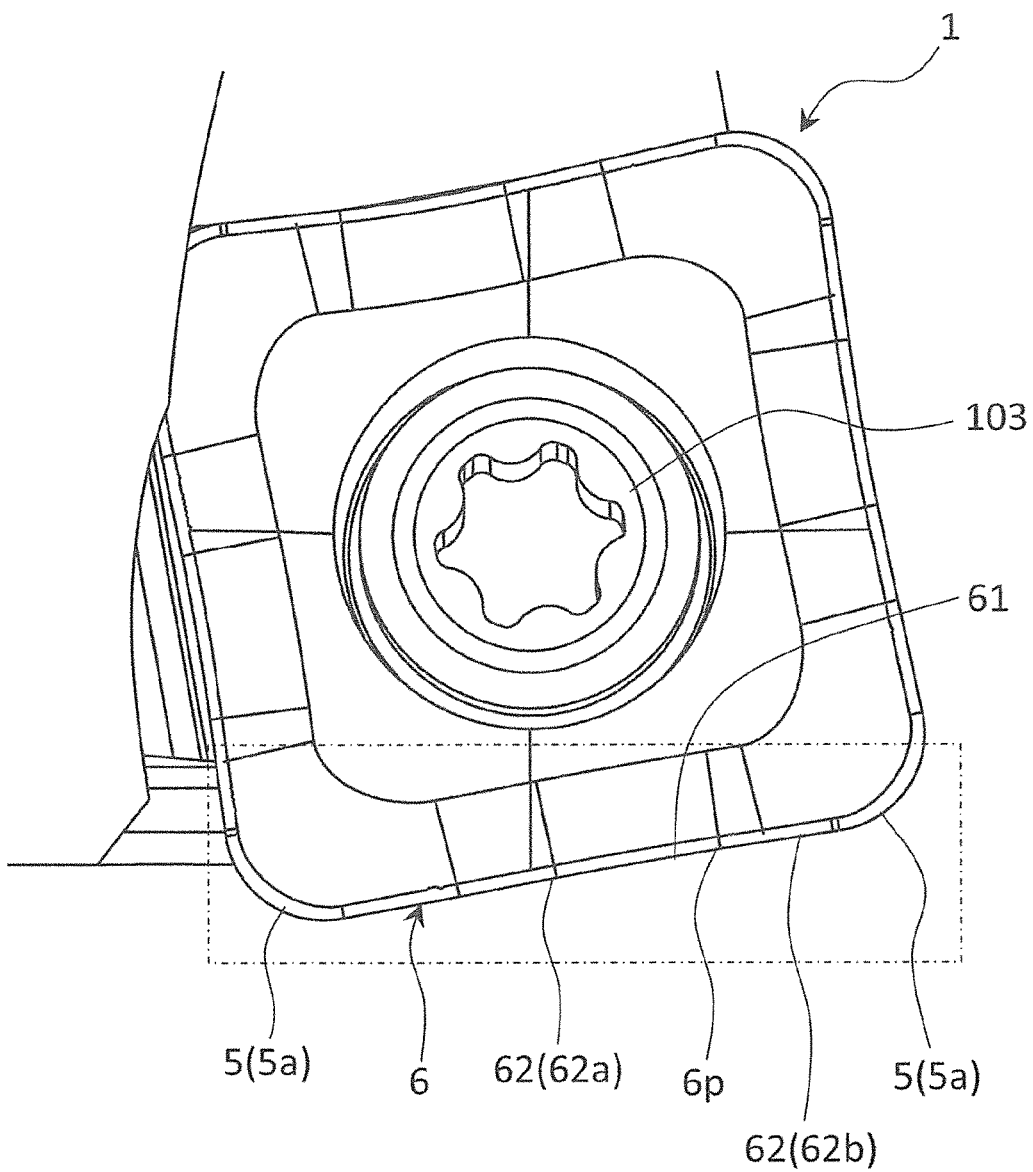
FIG. 6 is a side view showing in enlarged dimension an attachment state of the cutting insert that is a part of the cutting tool shown in FIG. 5.

As shown in FIG. 6, the bottom portion 6p of the curvilinear part 61 (first section 61) is disposed close to the second corner cutting edge 5b of the pair of corner cutting edges 5 (5a, 5b) which is located above, in a state in which the insert 1 is attached to the holder 101. In other words, when cutting the workpiece 200 located below, the bottom portion 6p is close to the second corner cutting edge 5b of the pair of corner cutting edges 5 (5a, 5b) which is located away from the processing surface of the workpiece.

By locating the bottom portion 6p close to the second corner cutting edge 5b when cutting the workpiece, the insert 1 is capable of ensuring a region of a small cutting edge angle in the major cutting edge 6 with respect to the workpiece while ensuring an amount of depth of cut of the major cutting edge 6 as a whole, in the state in which the insert 1 is attached to the holder 101. Specifically, it is possible to decrease a cutting edge angle of a second straight part 62b connected to the second corner cutting edge 5b.

When the amount of depth of cut is large as in the case of using a region of the major cutting edge 6 which also covers a portion close to the second corner cutting edge 5b, a cut resistance against the major cutting edge 6 also becomes extremely large. It is however possible to reduce the cut resistance applied to the straight part 62 owing to the small cutting edge angle of the straight part 62b connected to the second corner cutting edge 5b that is apt to receive the relatively large load. It is therefore possible to reduce cut resistance applied to the entirety of the major cutting edge 6.

It is consequently possible to thin chips and reduce heat generated in the major cutting edge 6 particularly in a high-feed-rate processing in which a cutting edge angle is 30° or less. Specifically, even when a depth of cut is increased and the insert 1 is subjected to large cut resistance during an engraving process or the like, the cutting edge located at a position at which the depth of cut is large has a small cutting edge angle. This makes it possible to decrease a chip thickness and reduce load applied to the cutting edge, thereby reducing the occurrence of fracture of the major cutting edge 6. The occurrence of fracture of the major cutting edge 6 is thus reducible.

The insert 1 of the present embodiment has the square shape in the top view, and has four side parts and four corer parts. A pair of two corner parts is adjacent to each of the side parts. Therefore, the insert 1 of the present embodiment has four major cutting edges 6. The corner cutting edges 5 are disposed between the major cutting edges 6 located along the outer edge of the upper surface 3. Accordingly, there are four corner cutting edges 5.

The insert 1 of the present embodiment has the square shape in the top view. Accordingly, there are the four major cutting edges 6 and the four corner cutting edges 5, but not limited to this. The number of each of the major cutting edges 6 and the corner cutting edges 5 may be, for example, three, five, or six or more according to the polygonal shape of the insert 1 in the top view.

Figure 4:
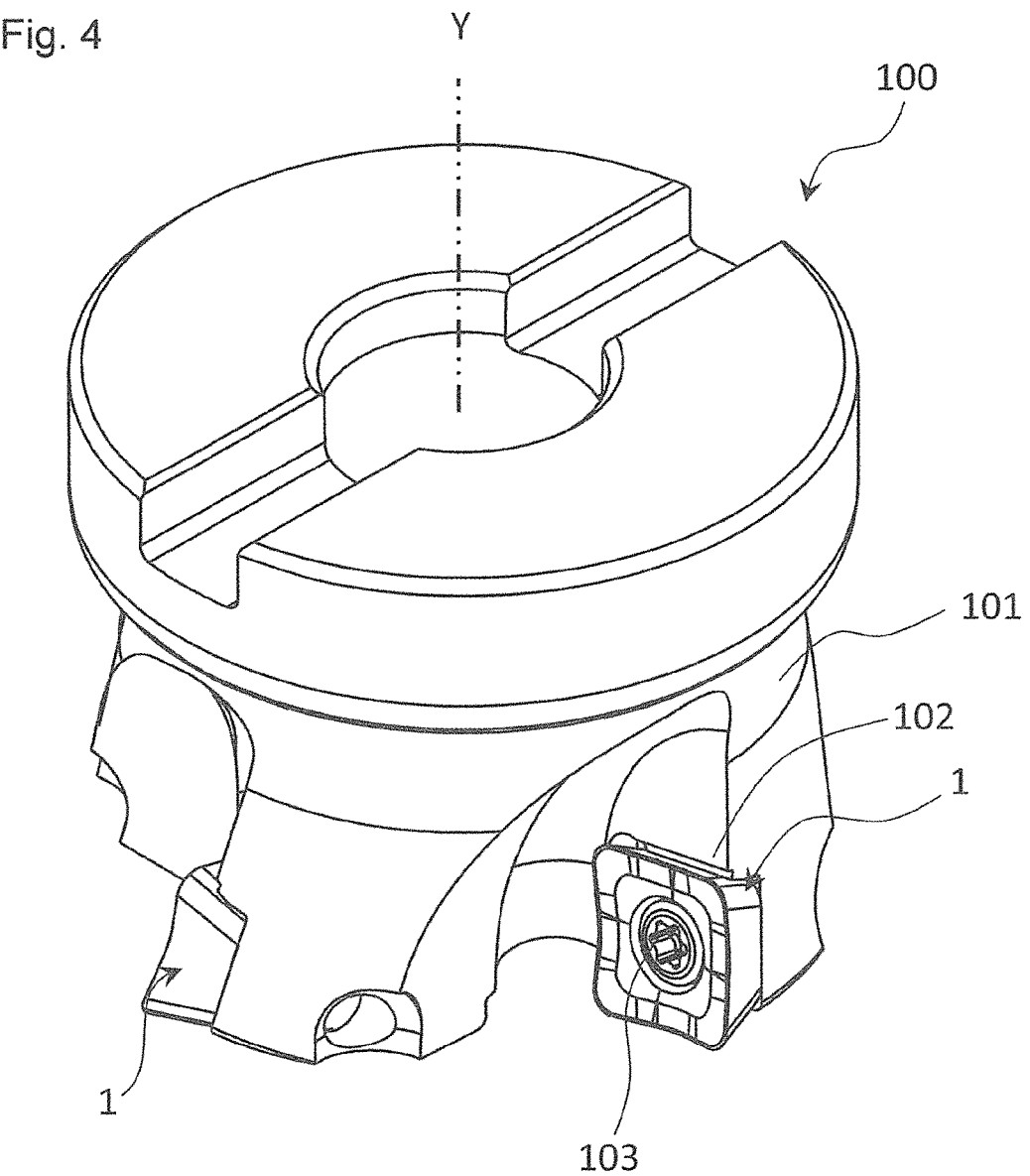
FIG. 4 is a perspective view showing a cutting tool of an embodiment.

One of the four major cutting edges 6 is used in the cutting process of the workpiece in the cutting tool 100 that uses the insert 1 of the present embodiment and is shown in FIG. 4. When the major cutting edge 6 being used is deteriorated due to the cutting process over a long period of time, the insert 1 needs to be temporarily removed from the holder 101, and thereafter attached again to the holder 101 by rotating the insert 1 90° with respect to the central axis X. Thus, other major cutting edge 6 that is not yet used is usable in the cutting process of the workpiece 200.

The intersection of the upper surface 3 and the side surface 4 is not a strict line form made by intersection of the two surfaces. When the intersection of the upper surface 3 and the side surface 4 is sharpened at an acute angle, the durability of the major cutting edge 6 may deteriorate. Hence, an intersecting portion of the upper surface 3 and the side surface 4 may have a slightly curvilinear shape, that is, may be subjected to a so-called honing process.

The major cutting edge 6 does not have the straight-like line as a whole in a side view, but has a downwardly concaved shape in a state in which the lower surface 2 is placed below and the upper surface 3 is placed above. Specifically, the major cutting edge 6 has the curvilinear part 61 (first section 61) having the downwardly dented concave curvilinear shape and the pair of straight line parts 62 (second sections 62) disposed continuously with the curvilinear part 61. The pair of straight line parts 62 respectively extend from the curvilinear part 61 toward the pair of corner cutting edges 5. When the major cutting edge 6 has this shape, it is easier to cause the major cutting edge 6 to be obliquely contacted with the workpiece than when the major cutting edge 6 has a straight-like line parallel to the upper surface 3. It is therefore possible to reduce cut resistance when the major cutting edge 6 bites into the workpiece, thus leading to a satisfactory cutting process of the workpiece.

One of the pair of straight parts 62 (second sections 62) which extends toward the first corner cutting edge 5a is taken as a first straight part 62a, and the other extending toward the second corner cutting edge 5b is taken as a second straight part 62b.

Figure 5:
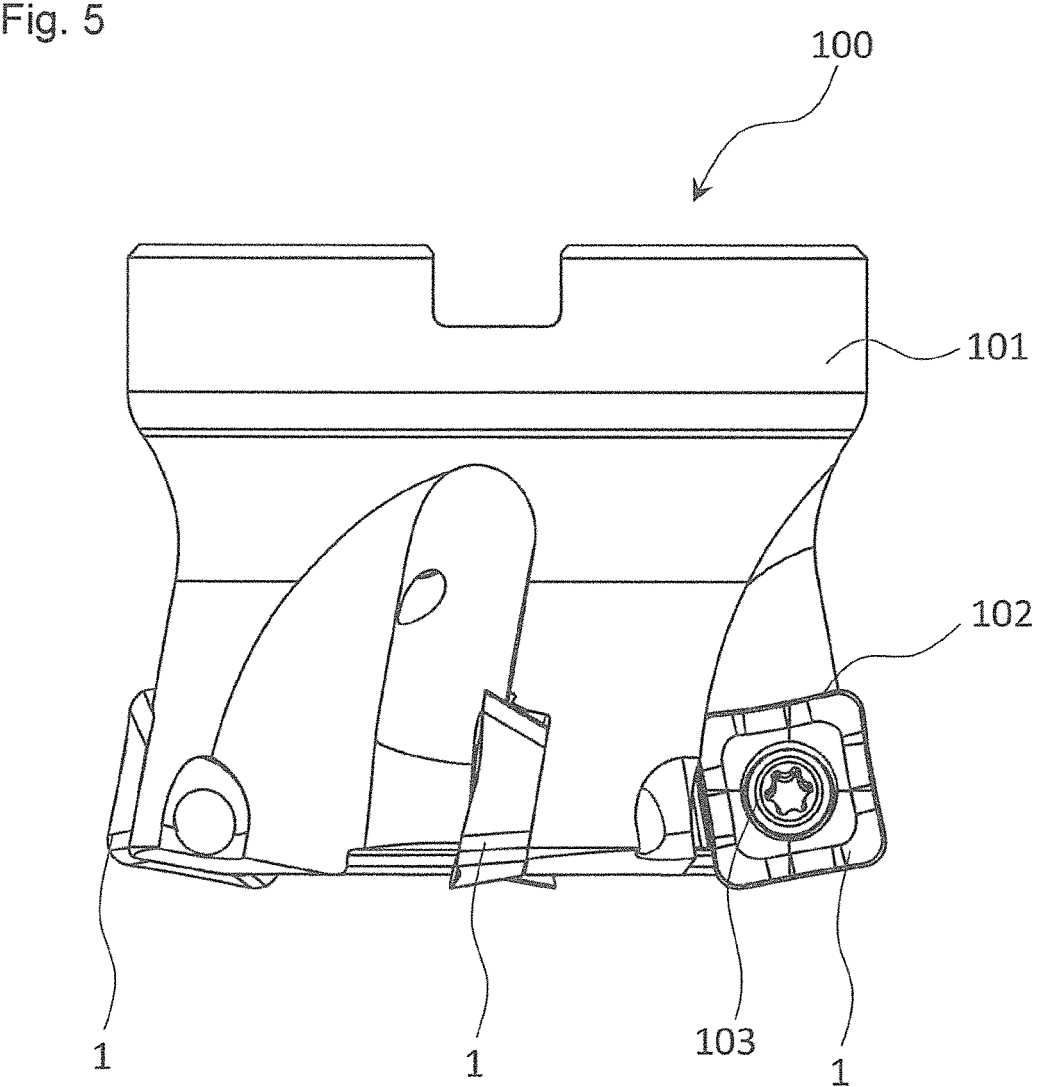
FIG. 5 is a side view of the cutting tool shown in FIG. 4.

The description that the straight part 62 extends toward the corner cutting edges 5 is not intended to limit to the meaning that a virtual extension line of the straight part 62 intersects the corner cutting edges 5, but implies that the straight part 62 merely extends toward the side on which the pair of corner cutting edges 5a and 5b are located. For example, in FIG. 5, the first corner cutting edge 5a is located at a left end, and therefore, one that extends from the curvilinear part 61 toward a left side is taken as the first straight part 62a. In FIG. 5, the second corner cutting edge 5b is located at a right end, and therefore, one that extends from the curvilinear part 61 toward a right side is taken as the second straight part 62b.

The shape of the curvilinear part 61 is not particularly limited as long as having the downwardly dented concave curvilinear shape. It is possible to employ, for example, an arc shape, an elliptical arc shape, or a parabolic shape. In the present embodiment, the curvilinear part 61 has the downwardly dented arc shape. In this case, it is less liable to receive influence of an axial rake when the insert 1 is attached to the holder 101, thereby allowing the insert 1 to stably bite into the workpiece.

Here, the major cutting edge 6 is described below assuming that the entirety of the major cutting edge 6 has the straight-like line. Strong chatter vibration occurs in the insert 1 when the major cutting edge 6 of the insert 1 starts to bite into an end surface of the workpiece 200. When the entirety of the major cutting edge 6 has a mere straight-like line, the entirety of the major cutting edge 6 may start to simultaneously come into contact with the workpiece 200 depending on an angle at which the major cutting edge 6 starts to come into contact with the workpiece 200. Consequently, large impact may be applied to the insert 1, and vibration may occur, causing chatter vibration. Furthermore, the occurrence of chatter vibration makes it difficult to improve cutting conditions, failing to improve machining efficiency.

If the entirety of the major cutting edge 6 has the downwardly concave curvilinear shape, the major cutting edge 6 may start to make a point contact with the workpiece. However, when started to bite into the workpiece, the full length of the major cutting edge 6 becomes longer than one in which the entirety of the major cutting edge 6 has the straight-like line. This may lead to a longer period of time during which strong impact is continuously applied to the insert 1.

In the insert 1 of the present embodiment, the major cutting edge 6 has the first section 61 having the downwardly dented concave curvilinear shape, and the pair of second sections 62 disposed continuously with the first section 61. Therefore, the entirety of the major cutting edge 6 does not come into contact with the workpiece 200 when started to bite into the workpiece 200. It is also possible to decrease the full length of the major cutting edge 6 than the case where the entirety of the major cutting edge 6 has the downwardly dented concaved curvilinear shape over the full length of the major cutting edge 6. Therefore, the insert 1 of the present embodiment is capable of reducing cut resistance, relaxing impact, and preventing an increase in cut resistance when the insert 1 starts to bite into the workpiece.

When a surface of the workpiece has significant unevenness, a depth of cut is considerably varied all the time. On this occasion, if the entirety of the major cutting edge 6 has the concave curvilinear shape, a cutting edge angle is not constant, failing to carry out a stable cutting process. However, with the present embodiment, the major cutting edge 6 has the straight part 62, and a region where the cutting edge angle is constant is divided into two stages, thereby reducing variations in cut resistance due to a change in depth of cut.

Figure 7:
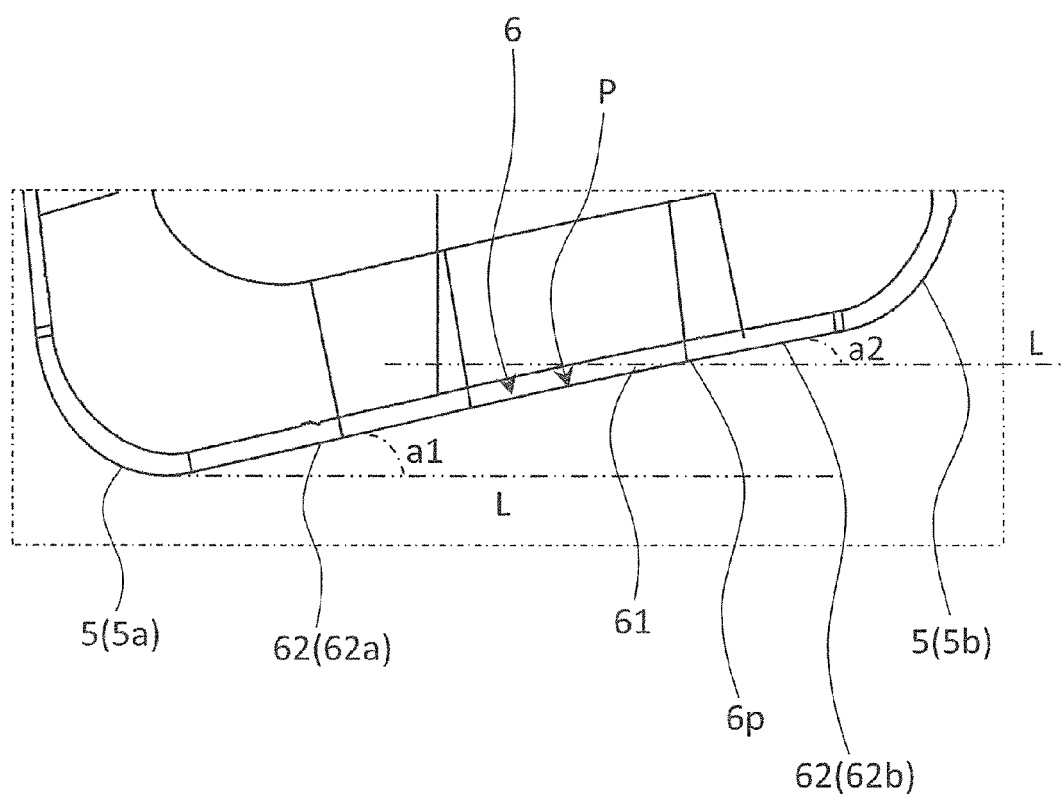
FIG. 7 is a side view showing in enlarged dimension a major cutting edge of the cutting insert shown in FIG. 6.

As shown in FIG. 6 or 7, the bottom portion 6p that is the portion located lowermost in the curvilinear part 61 of the major cutting edge 6 is disposed close to the second corner cutting edge 5b of the pair of corner cutting edges 5 (5a, 5b) which is located away from the processing surface of the workpiece. The bottom portion 6p is disposed at a position in a downward direction which is, for example, 0.2-1.2 mm lower than a height position of the corner cutting edge 5b. As shown in FIG. 7, the major cutting edge 6 has a length of, for example, 5-25 mm in a plane direction along the lower surface 2, and the bottom portion 6p is disposed with deviation of, for example, 0.5-1.5 mm toward the second corner cutting edge 5b with respect to a central position P of the length of the major cutting edge 6 in the plane direction.

Of the pair of straight parts 62 (62a, 62b), the second straight part 62b close to the second corner cutting edge 5b is made shorter than the first straight part 62a close to the first corner cutting edge 5a. This makes it possible to ensure a large amount of depth of cut of the major cutting edge 6 as a whole. In the state in which the insert 1 is attached to the holder 101, an inclination angle of the major cutting edge 6 with respect to a parallel line L along the surface of the workpiece is as follows. That is, setting is made so that an inclination angle a1 of the first straight part 62a extending toward the corner cutting edge 5a is, for example, 5-15°, and an inclination angle a2 of the second straight part 62b extending toward the corner cutting edge 5b is, for example, 3-13°. The setting is also made so that the inclination angle a2 is smaller than the inclination angle a1.

Furthermore, owing to the fact that, of the pair of straight parts 62 (62a, 62b), the second straight part 62b close to the second corner cutting edge 5b is shorter than the first straight part 62a close to the first corner cutting edge 5a, it is possible to effectively decrease a contact length that the second straight part 62b comes into contact with the workpiece 200. It is therefore possible to reduce an increase in cut resistance when the second straight part 62b starts to bite into the workpiece 200. Specifically, owing to the fact that the inclination angle a2 of the second straight part 62b with respect to the parallel line L is smaller than the inclination angle a1 of the first straight part 62a, and the length of the second straight part 62b is smaller than the length of the first straight part 62a, it is possible to decrease a chip thickness obtainable by the second straight part 62b to be used when the amount of depth of cut is large. It is therefore possible to improve fracture resistance and improve strength of the insert 1.

As described above, the major cutting edge 6 has the curvilinear part 61 having the downwardly dented concave curvilinear shape, and the pair of straight parts 62 disposed continuously with the curvilinear part 61. Hence, there are advantages of both in the case where the entirety of the major cutting edge 6 has the straight-like line, and the case where the entirety of the major cutting edge 6 has the concave curvilinear shape. Furthermore, owing to the fact that the bottom portion 6p of the curvilinear part 61 is close to the second corner cutting edge 5b, it is possible to effectively reduce the disadvantage that the contact length during contact with the workpiece 200 becomes long when the entirety of the major cutting edge 6 has the straight-like line. With the insert 1 of the present embodiment, the major cutting edge 6 has the downwardly concaved shape as a whole. It is therefore avoidable that the entirety of the major cutting edge 6 comes into contact with the workpiece at the same time when the major cutting edge 6 comes into contact with the workpiece. This makes it possible to carry out a satisfactory cutting.

In the insert 1 according to the present embodiment, the major cutting edge 6 has the concaved curvilinear part 61 and the pair of straight parts 62 (62a, 62b) that respectively extend from the curvilinear part 61 toward the pair of corner cutting edges 5 (5a, 5b) in the side view. The bottom portion 6p in the curvilinear part 61 is close to the second corner cutting edge 5b of the pair of corner cutting edges 5 (5a, 5b) which is located above when cutting the workpiece 200 located below. This contributes to relaxing impact and preventing an increase in cut resistance when the insert 1 starts to bite into the workpiece 200.

Additionally, the major cutting edge 6 in the present embodiment has the concave shape that is dented toward the inside of the upper surface 3 in the top view. In other words, the major cutting edge 6 in the present embodiment has the concave shape that is dented toward the center of the upper surface 3. Here, being dented toward the center of the upper surface 3 implies being located closer to the center of the upper surface 3 than a tangent line that contacts both of the pair of corner cutting edges 5 (5a, 5b). A distance between a portion closest to the center of the upper surface 3 and the tangent line is set in a range of 0.02-0.2 mm.

The major cutting edge 6 in the present embodiment has the concave shape in the top view as described above. Therefore, when cutting the workpiece by attaching the insert 1 to the holder 101, it is possible to decrease a cutting edge angle on the outer peripheral side of the major cutting edge 6. This contributes to decreasing a chip thickness in the vicinity of the corner cutting edges 5 during a shoulder milling process, thereby relaxing impact during cutting. It is therefore possible to improve fracture resistance of the corner cutting edges 5 and the major cutting edge 6.

The present invention is not limited to the foregoing embodiment, and various changes, improvements, or the like can be made therein without departing from the spirit and scope of the present invention.

<Cutting Tool>

A cutting tool 100 of an embodiment is described below with reference to FIGS. 4 to 7. FIGS. 4 to 6 show a state in which the insert 1 is attached via a screw 103 to an insert pocket 102 (hereinafter also referred to simply as the pocket 102) of the holder 101. A chain double-dashed line in FIG. 4 indicates a rotation central axis Y of the cutting tool 100.

As shown in FIGS. 4 to 6, the cutting tool 100 of the present embodiment includes the holder 101 having the rotation central axis Y and having a plurality of pockets 102 on an outer peripheral surface on a front end side of the holder 101, and the insert 1 to be attached to each of the pockets 102.

The holder 101 has an approximately columnar shape around the rotation central axis Y. The pockets 102 are disposed on the outer peripheral surface on the front end side of the holder 101. The pockets 102 are portions to which the insert 1 is attached, and open into the outer peripheral surface and a front end surface of the holder 101. The pockets 102 may be disposed at equal intervals or unequal intervals. The holder 101 is provided with the pockets 102, and therefore does not have a strict columnar shape.

The inserts 1 are respectively attached to the pockets 102 disposed on the holder 101. The inserts 1 are attached so that the major cutting edge 6 protrudes forward beyond the front end surface of the holder 101, namely, further toward the workpiece beyond the front end surface of the holder 101. Specifically, the inserts 1 are attached to the holder 101 so that the first corner cutting edge 5a and a part of the major cutting edge 6 protrude beyond the front end surface of the holder 101.

On this occasion, the first corner cutting edge 5a is secured to a position that protrudes most beyond the front end surface of the holder 101 during cutting. As shown in FIG. 5, the inserts 1 are respectively attached to the pockets 102 of the holder 101 so that the corner cutting edge 5a protrudes forward beyond the front end surface of the holder 101. Thereby, the inserts 1 are fixed to the holder 101 so that the bottom portion 6p of the curvilinear part 61 is close to the second corner cutting edge 5b located above and away from the processing surface of the workpiece.

Each of the inserts 1 is attached via the screw 103 to the pocket 102 in the present embodiment. That is, each of the inserts 1 is attached to the holder 101 by inserting the screw 103 into the through hole H of the insert 1, and then inserting a front end of the screw 103 into a screw hole (not shown) formed in the pocket 102, and thereafter fixing the screw 103 to the screw hole. For example, steel and cast iron are usable as the holder 101. Of these materials, it is particularly preferable to use high-rigidity steel.

<Method of Manufacturing Machined Product>

Figure 8:
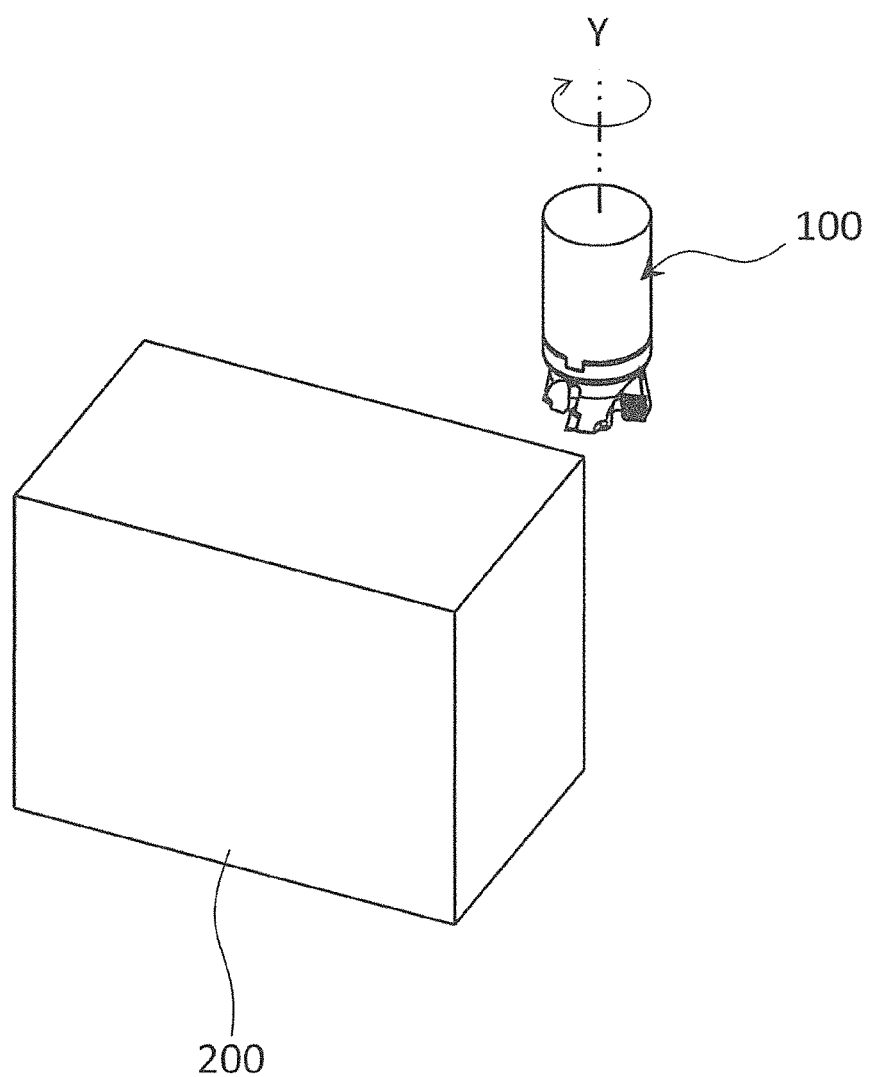
FIG. 8 is a perspective view showing a step in a method of manufacturing a machined product according to an embodiment.
Figure 9:
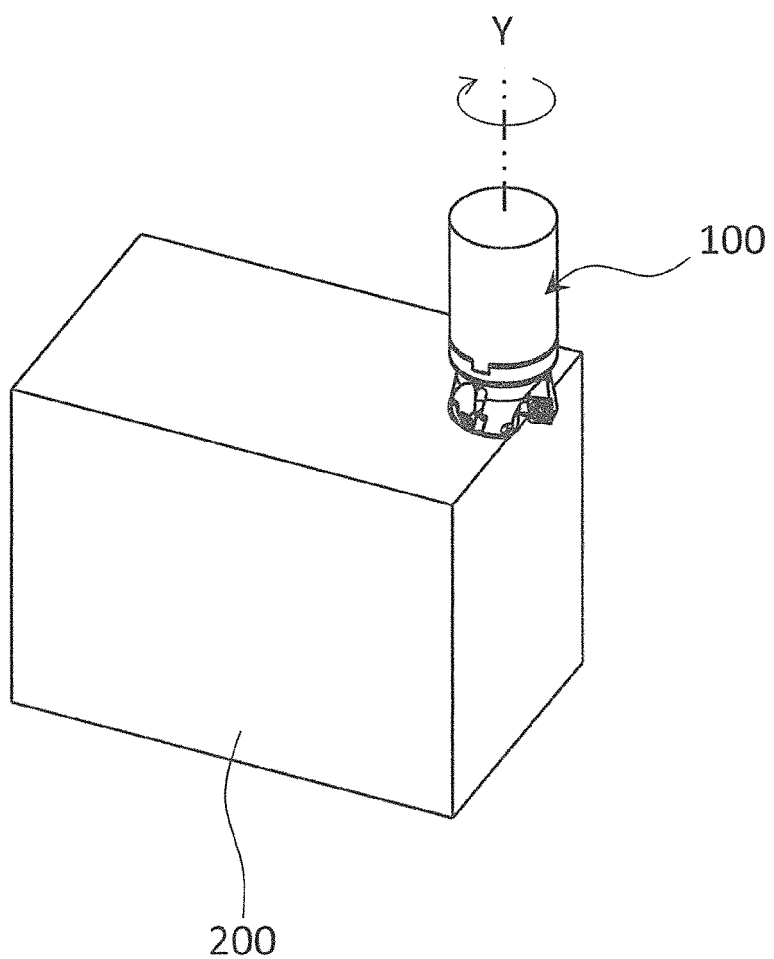
FIG. 9 is a perspective view showing a step in the method of manufacturing the machined product according to the embodiment.
Figure 10:
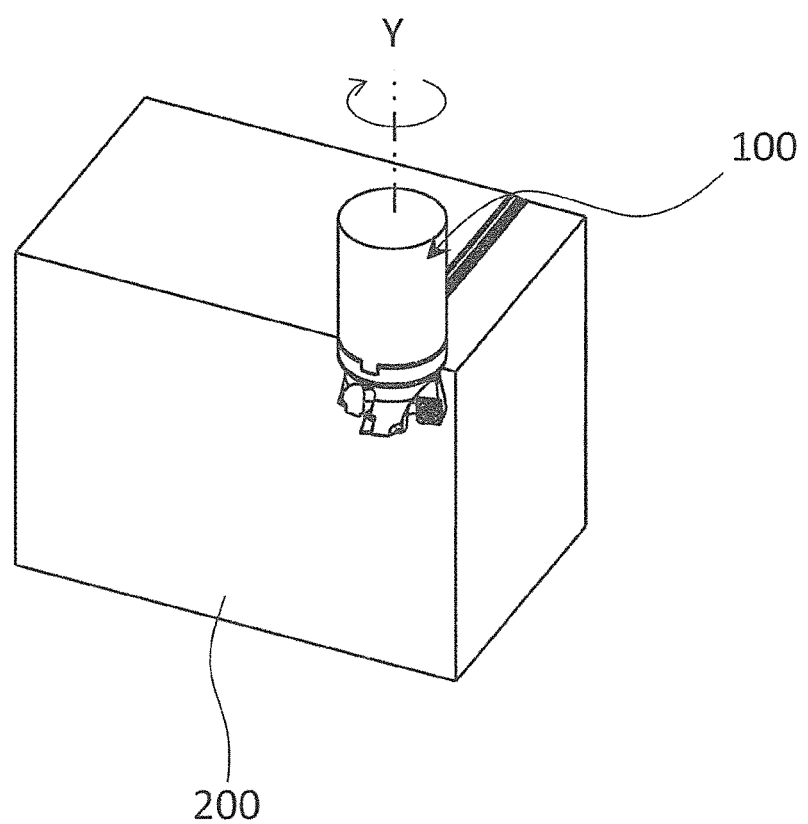
FIG. 10 is a perspective view showing a step in the method of manufacturing the machined product according to the embodiment.

A method of manufacturing a machined product according to an embodiment is described below with reference to FIGS. 8 to 10. FIGS. 8 to 10 show the method of manufacturing the machined product. The machined product is manufacturable by subjecting a workpiece to a cutting process. A cutting method in the present embodiment includes the following steps:

(1) rotating the cutting tool 100 as typified by the foregoing embodiment;

(2) bringing the major cutting edge 6 in the cutting tool 100 being rotated into contact with the workpiece 200; and (3) separating the cutting tool 100 from the workpiece 200.

More specifically, a first step is to bring the cutting tool 100 relatively near the workpiece 200 while rotating the cutting tool 100 around the rotation central axis Y. A subsequent step is to cut the workpiece 200 by bringing the major cutting edge 6 of the cutting tool 100 into contact with the workpiece 200 as shown in FIG. 9. A final step is to keep the cutting tool 100 relatively away from the workpiece 200.

In the present embodiment, the workpiece 200 is fixed and the cutting tool 100 is brought near. In FIGS. 8 and 9, the workpiece 200 is fixed and the cutting tool 100 is rotated around the rotation central axis Y. In FIG. 10, the workpiece 200 is fixed and the cutting tool 100 is kept away. Although the workpiece 200 is fixed and the cutting tool 100 is moved in each of the steps in the cutting process in the manufacturing method of the present embodiment, it is, of course, not intended to limit to this embodiment.

For example, in the step (1), the workpiece 200 may be brought near the cutting tool 100. Similarly, in the step (3), the workpiece 200 may be kept away from the cutting tool 100. When the cutting process is continued, it is necessary to repeat the step of bringing the major cutting edge 6 of the insert 1 into contact with different portions of the workpiece 200, while the cutting tool 100 is kept rotating. When the major cutting edge 6 being used is worn away, the major cutting edge 6 not yet used needs to be used by rotating the insert 1 90 degrees with respect to the central axis X of the through hole H. Representative examples of the material of the workpiece 200 include carbon steel, alloy steel, stainless steel, cast iron, and nonferrous metals.

DESCRIPTION OF THE REFERENCE NUMERAL 1 cutting insert (insert)
2 lower surface
3 upper surface
31 land surface
32 rake surface
321 first rake surface
322 second rake surface
323 third rake surface
4 side surface
41 plane part
42 curved surface
5 corner cutting edge
5a first corner cutting edge
5b second corner cutting edge
6 major cutting edge
61 first section (curvilinear part)
62 second section (straight part)
62a first straight part
62b second straight part
6p bottom portion
X central axis
H through hole
100 cutting tool
101 holder
102 insert pocket (pocket)
103 screw
Y rotation central axis
200 workpiece

The invention claimed is:

1. A cutting insert, comprising:
a polygonal shaped upper surface comprising a pair of corner parts and a side part located between the pair of corner parts;
a polygonal shaped lower surface corresponding to the upper surface;
a side surface disposed between the lower surface and the upper surface;
a pair of corner cutting edges located along an intersection of the pair of corner parts of the upper surface and the side surface and comprising a first corner cutting edge and a second corner cutting edge; and
a major cutting edge located along an intersection of the side part of the upper surface and the side surface,
wherein the major cutting edge has a downwardly dented concave shape and comprises
a first section having a downwardly dented concave curvilinear shape in a side view, and
a pair of second sections being in a shape of a straight-like line, each of the pair of second sections respectively extending from the first section toward the pair of corner cutting edges and increasing in height with respect to the lower surface as each of the pair of second sections approaches the pair of corner cutting edges, and
wherein a bottom portion of the first section, which is located at a lowermost part of the first section, is closer to the second corner cutting edge than the first corner cutting edge in the side view,
wherein the upper surface further comprises:
a first rake surface located along the first section of the major cutting edge,
a second rake surface located along each of the pair of second sections of the major cutting edge, and
a third rake surface located along the corner cutting edge, and
wherein a rake angle of the second rake surfaces is larger than a rake angle of each of the first rake surface and the third rake surface.

2. The cutting insert according to claim 1,
wherein the pair of second sections comprises:
a first straight part extending from the first section to the first corner cutting edge, and
a second straight part extending from the first section to the second corner cutting edge, and
wherein the first straight part is longer than the second straight part.

3. The cutting insert according to claim 1, wherein the side surface comprises a plane part located at a portion corresponding to the major cutting edge.

4. The cutting insert according to claim 1, wherein the major cutting edge has an inwardly dented concave shape in a top view.

5. The cutting insert according to claim 1, wherein the rake angle of the first rake surface is larger than the rake angle of the third rake surface.

6. The cutting insert according to claim 1, wherein the bottom portion of the first section is close to the second corner cutting edge which is located away from a processing surface of a workpiece when cutting the workpiece.

7. A cutting tool, comprising:
a holder comprising a plurality of insert pockets at a front end part of the holder, and
a cutting insert according to claim 1, the cutting insert being attached to the insert pocket so that the major cutting edge protrudes beyond the holder.

8. A method of manufacturing a machined product, comprising:
rotating the cutting tool according to claim 7;
bringing the major cutting edge in the cutting tool being rotated into contact with a workpiece; and
separating the cutting tool from the workpiece.

9. A cutting insert, comprising:
an upper surface comprising a pair of corner parts and a side part located between the pair of corner parts;
a lower surface corresponding to the upper surface;
a side surface located between the upper surface and the lower surface;
a pair of corner edges located along an intersection of the pair of corner parts of the upper surface and the side surface and comprising a first corner edge and a second corner edge; and
a first edge located along an intersection of the side part of the upper surface and the side surface,
wherein, in a side view, the first edge comprises a first portion, the first portion having a downwardly concave shape and comprising a bottom portion which is located at a lowermost part of the first portion,
wherein the bottom portion of the first portion is closer to the second corner edge than the first corner edge and is apart from the second corner edge, and
wherein a cutting edge angle of the first edge at a side closer to the first corner edge than the second corner edge is different from a cutting edge angle of the first edge at a side closer to the second corner edge than the first corner edge, and wherein the upper surface further comprises: a first region located along the first portion of the first edge and inclined downward from the first edge at a first angle; and a second region located along the second corner edge and inclined downward from the second corner edge at a second angle; and wherein the first angle is larger than the second angle.

10. The cutting insert according to claim 9, wherein the first portion comprises a inclined portion extending from the bottom portion toward the second corner edge and increasing in height with respect to the lower surface as the inclined portion approaches the second corner edge.

11. The cutting insert according to claim 9, wherein the first portion has a curvilinear shape.

12. The cutting insert according to claim 9, wherein the cutting edge angle of the first edge at the side close to the first corner edge is larger than the cutting edge angle of the first edge at the side close to the second corner edge.

13. The cutting insert according to claim 9,
wherein the first edge further comprises a second portion extending from the first portion toward the first corner edge and increasing in height with respect to the lower surface as the second portion approaches the first corner edge,
wherein the upper surface further comprises a third region located along the second portion of the first edge and inclined downward from the first edge at a third angle, and
wherein the third angle is larger than the first angle.

14. The cutting insert according to claim 9, wherein the bottom portion of the first portion is close to the second corner edge which is located away from a processing surface of a workpiece when cutting the workpiece.

15. The cutting insert according to claim 9, wherein, in a side view, the second corner edge comprises a portion inclined downward toward the first edge.

16. A cutting tool, comprising:
a holder comprising a plurality of insert pockets at a front end part of the holder, and
a cutting insert according to claim 9, the cutting insert being attached to the insert pocket so that at least one part of the first edge protrudes beyond the holder.

17. The cutting tool according to claim 16, wherein the first corner edge protrudes most beyond the holder.

18. The cutting tool according to claim 16, wherein the cutting insert is attached to the insert pocket with a positive axial rake angle.

19. A cutting insert, comprising:
an upper surface comprising a pair of corner parts and a side part located between the pair of corner parts;
a lower surface corresponding to the upper surface;
a side surface located between the upper surface and the lower surface;
a pair of corner edges located along an intersection of the pair of corner parts of the upper surface and the side surface and comprising a first corner edge and a second corner edge; and
a first edge located along an intersection of the side part of the upper surface and the side surface,
wherein, in a side view, the first edge comprises a first portion, the first portion having a downwardly concave shape and comprising a bottom portion which is located at a lowermost part of the first portion,
wherein the bottom portion of the first portion is closer to the second corner edge than the first corner edge and is apart from the second corner edge, and
wherein the first portion comprises a first region having a first cutting edge angle and a second region having a second cutting edge angle, the first cutting edge angle being different from the second cutting edge angle, and wherein the upper surface further comprises: a first region located along the first portion of the first edge and inclined downward from the first edge at a first angle; and a second region located along the second corner edge and inclined downward from the second corner edge at a second angle; and wherein the first angle is larger than the second angle.

* * * * *